(12) United States Patent
Woytassek

(10) Patent No.: US 6,942,047 B2
(45) Date of Patent: Sep. 13, 2005

(54) DRIFT ADJUSTMENT FOR SKID STEERING SYSTEM

(75) Inventor: John F. Woytassek, Lidgerwood, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 223 days.

(21) Appl. No.: 10/447,648

(22) Filed: May 29, 2003

(65) Prior Publication Data

US 2003/0234131 A1 Dec. 25, 2003

Related U.S. Application Data

(60) Provisional application No. 60/386,917, filed on Jun. 6, 2002.

(51) Int. Cl.[7] .......................... B60K 26/02; B62D 11/04; G05G 5/04
(52) U.S. Cl. .......................... 180/6.48; 180/333; 74/526
(58) Field of Search ............................. 180/6.48, 333, 180/336; 74/526, 527

(56) References Cited

U.S. PATENT DOCUMENTS

| | | | |
|---|---|---|---|
| 2,955,483 A | * 10/1960 | Slomer | .......................... 74/527 |
| 3,448,634 A | * 6/1969 | Eggers et al. | .................. 74/560 |
| 3,563,109 A | 2/1971 | Glass et al. | .................... 74/470 |
| 3,605,519 A | 9/1971 | Heggen | ..................... 74/480 R |
| 3,850,258 A | 11/1974 | Bauer | .......................... 180/6.48 |
| 3,935,932 A | 2/1976 | Moorhouse | ............... 192/13 R |
| 4,090,411 A | 5/1978 | Albright et al. | ....... 74/471 XY |
| 4,227,428 A | 10/1980 | Zifferer et al. | ................ 74/526 |
| 4,570,730 A | 2/1986 | Kline et al. | ................. 180/6.48 |
| 6,161,637 A | 12/2000 | Decker et al. | ............. 180/6.48 |
| 6,830,111 B2 | * 12/2004 | Page | ........................... 172/42 |

* cited by examiner

Primary Examiner—Peter C. English
(74) Attorney, Agent, or Firm—Westman, Champlin & Kelly, P.A.

(57) ABSTRACT

An adjustment stop screw or bolt is provided for adjusting the full forward speed position of at least one steering lever on a skid steer loader. The stop screw will engage a member movable with the steering lever below the operator's platform. The stop screw can be adjusted through an opening in operator's platform to change the stopped forward speed position of the lever, and thus the full forward speed position of the linkage that controls the motor operated by that lever. This in turn adjusts the speed of the drive motor in a full forward position of the lever. The adjustment is made to match the output speeds of the drive motors on both sides of the skid steer vehicle.

9 Claims, 5 Drawing Sheets

DRIFT ADJUSTMENT FOR SKID STEERING SYSTEM

This application refers to and claims priority from U.S. Provisional Patent Application Ser. No. 60/386,917, filed Jun. 6, 2002, the content of which is incorporated by reference.

BACKGROUND OF THE INVENTION

The present invention relates to an adjustment to match the speed of rotation of drive wheels on opposite sides of a skid steer vehicle or loader when the conventional steering levers are in full forward speed drive positions. An adjustable stop for adjusting the maximum forward speed position for the drive control for the drive motor for one side of the vehicle is accessible from the interior of the loader cab to permit manual, easy adjustments. When both drive controls are in the maximum forward speed position the speed of the drive on each side of the skid steer loader is matched, and the loader will go straight forwardly.

The conventional hydrostatic drive systems on skid steer loaders have long been operated by a pair of levers in the cab that move forward and back from a neutral position. The levers rotate shafts that in turn connect to links leading to separate pump controls for pumps/motors on opposite sides of the loader.

U.S. Pat. No. 4,090,411 illustrates such a drive system, utilizing a self centering control. The steering levers are individually mounted and movable, and one lever controls the drive motor direction and speed on the right hand side of the vehicle, and the other lever controls the drive motor direction and speed on the left hand side of the vehicle. At present, the conventional skid steer lever arrangement does not permit quickly accessible adjustment for setting and matching the speeds of the motors on opposite sides of the loader at a full forward speed position of both of the steering levers.

SUMMARY OF THE INVENTION

The present invention relates to a simplified adjustable stop for at least one of the drive control and steering levers for a skid steer vehicle which permits the operator to adjust a stopped position of the lever at the full forward speed position. The vehicle drive comprises hydraulic or hydrostatic motors on the opposite sides of the vehicle and by adjusting the full speed position of one control, the speed of the motor controlled by the one lever can be matched in speed to the motor controlled by the other lever.

By this adjustment, an operator can assure that the skid steer vehicle will not tend to veer from a straight line when traveling forwardly at full speed.

Since the adjustment is easily accessible, the adjustment can be made easily during operations if any tendency to drift one way or the other is noted.

DETAILED DESCRIPTION OF THE PREFERRED EMBODIMENTS

Figure 1:
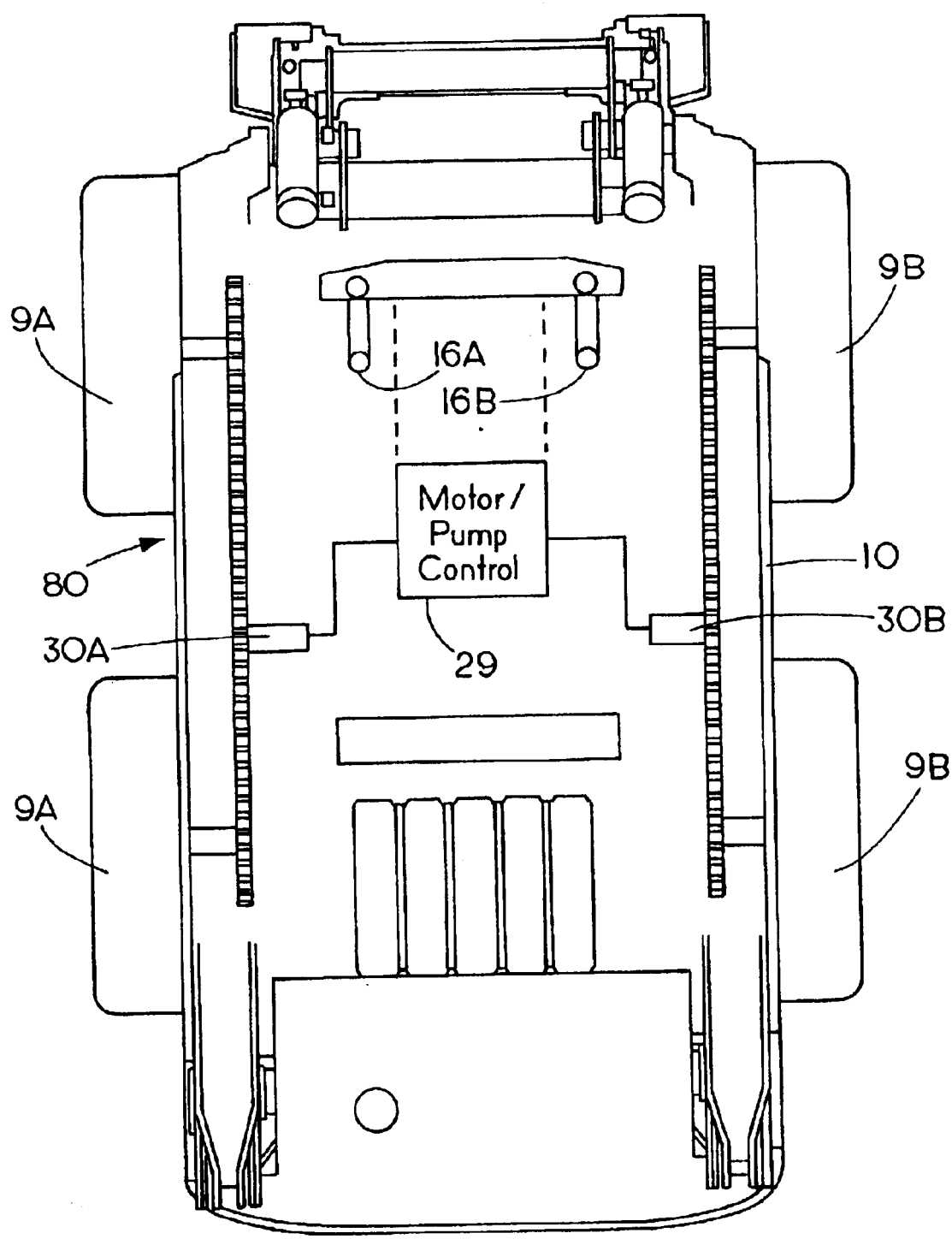
FIG. 1 is a top view of a skid steer loader schematically showing the control lever and drive.

The use of a pair of control levers for controlling movement of skid steer loaders is well known. As shown in FIG. 1, a skid steer vehicle comprising a loader 80 as shown and described, has wheels driven in pairs, including the pair of left side wheels 9A and the pair of right side wheels 9B. The loader 80 has a frame 10 that supports an engine for power to drive a pump 11 for providing fluid under pressure to the controllable drive motors and other components.

The drive control lever or sticks 16A and 16B are pivotally mounted on shafts below the operator's or cab platform 12, and extend into the cab. Each side of the loader is driven through a separate flow controlled, variable speed (swash plate) motor 30A and 30B. The speed of motors 30A and 30B is dependent upon the position of the respective steering levers. As can be seen, motor 30A drives both of the wheels 9A simultaneously and motor 30B drives both wheels 9B simultaneously.

In a neutral position of the levers 16A and 16B, the loader is stopped. Moving the levers 16A and 16B forward results in forward movement, with the speed of the controlled motor being proportional to the lever movement. When the levers 16A and 16B are both fully forward, maximum forward speed is achieved. The speed of the motors 30A and 30B should match each other to keep the loader traveling straight.

Figure 2:
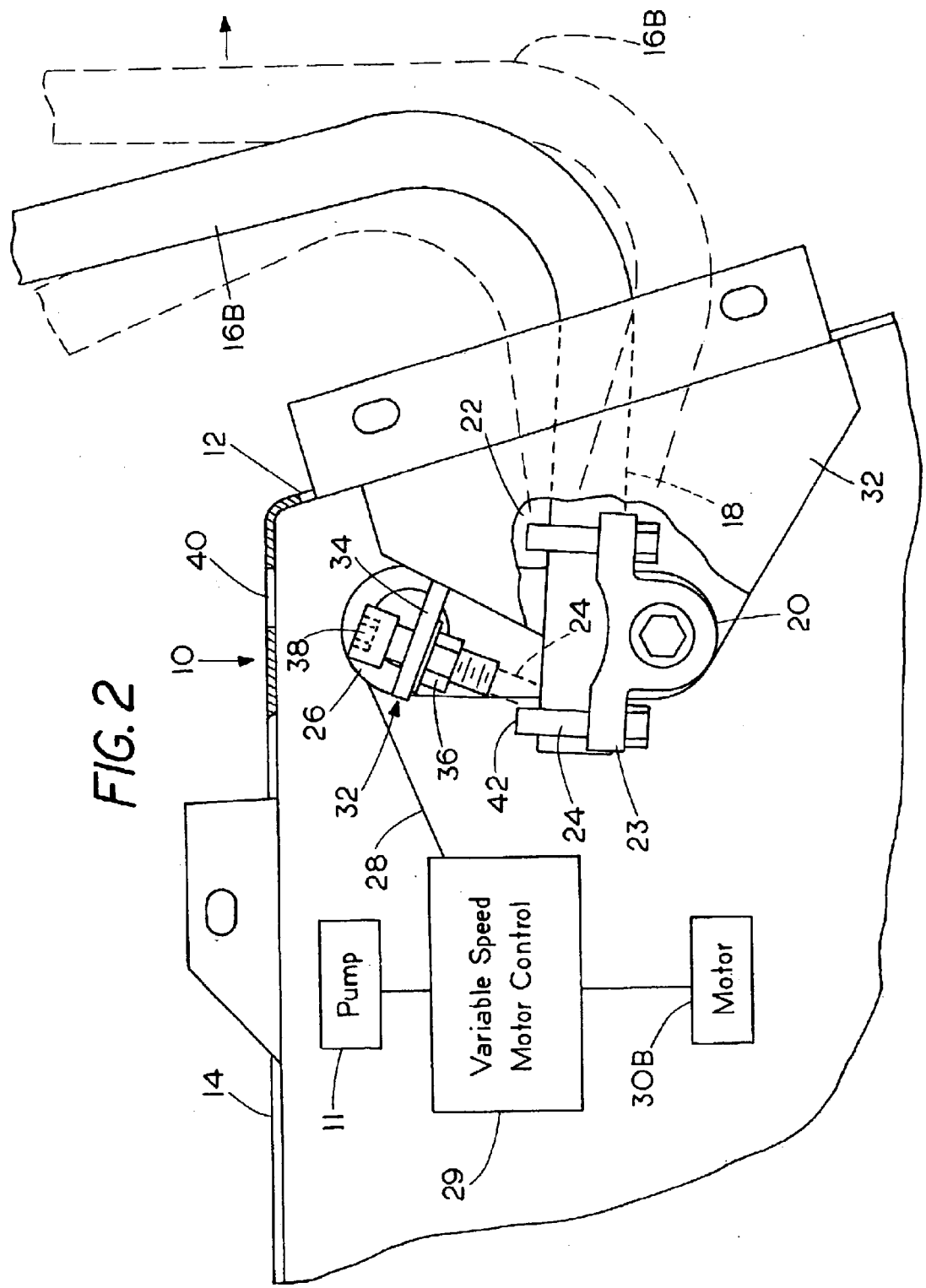
FIG. 2 is a fragmentary schematic side elevational sectional view showing a typical steering lever mounting on a pivoting shaft, and including a stop for adjusting the position of the lever according to the present invention.

The schematic showing of FIG. 2 is a fragmentary side view of a portion of the skid steer loader frame 10 that shows a front portion of platform 12 forming part of the frame, with an operator seat area 14 to the rear of the front portion of the platform. Control lever 16B is shown schematically, and it extends into the operator's cab, and is moved forward and rearward from a neutral position, in order to drive the controlled motor to propel the loader forward or rearward. The neutral position of lever 16B is substantially as shown in solid lines in FIG. 2.

The levers 16A and 16B also control the speed of the drive wheels on each side of the loader, and when going forwardly at the full forward position of the levers, it is important that the motors 30A and 30B are running at the same speed or else the loader will tend to "veer" or not run exactly straight.

The present invention provides an adjustment of the full forward position of one control lever, so that it can be "tweaked" to ensure that the drive speed of the motors on each side of the loader at full forward control lever stroke of both levers will be exactly the same. Both levers 16A and 16B can have the adjustable stop arrangement, if desired.

The lever 16B as shown has an arm portion 18, that is fastened to a saddle 23 drivably mounted on a rotatable mounting shaft 20 supported for pivoting on the frame 10. The lever arm 18 is fastened to the saddle 23 with suitable U-bolts 22 and 24. The lever 16B pivots and rotates the connected shaft 20 about the axis of shaft 20 between the dotted line positions shown in FIG. 2. The solid line position of lever 16B is the neutral position. The shaft 20, as schematically shown will move a lever 26 that in turn is connected through a link 28 to motor control 29 that adjusts a swash plate or variable speed drive pump/motor indicated at 30B. The motor control 29 also is standard, and the showing in FIG. 2 is simplified.

As the steering lever 16B is pushed forwardly, to achieve a desired forward speed, the shaft 20 rotates in a clockwise in FIG. 2, so that the end U-bolt 24 tends to move in an arc toward the inner side of the front portion of platform 12.

In the present invention, an adjustment stop bracket 32 is fixed in position on the front portion of platform 12, and has a projecting end flange 34 that has an adjustment nut 36 welded on the lower surface thereof. An adjustment screw 38 extends through the nut 36, and when the screw is threaded, it will move in and out along its axis. The adjustment screw 38 is accessible through an opening 40 in the horizontal portion of platform 12, from the interior of the operator's cab so that the screw 38 can moved in and out.

Figure 5:
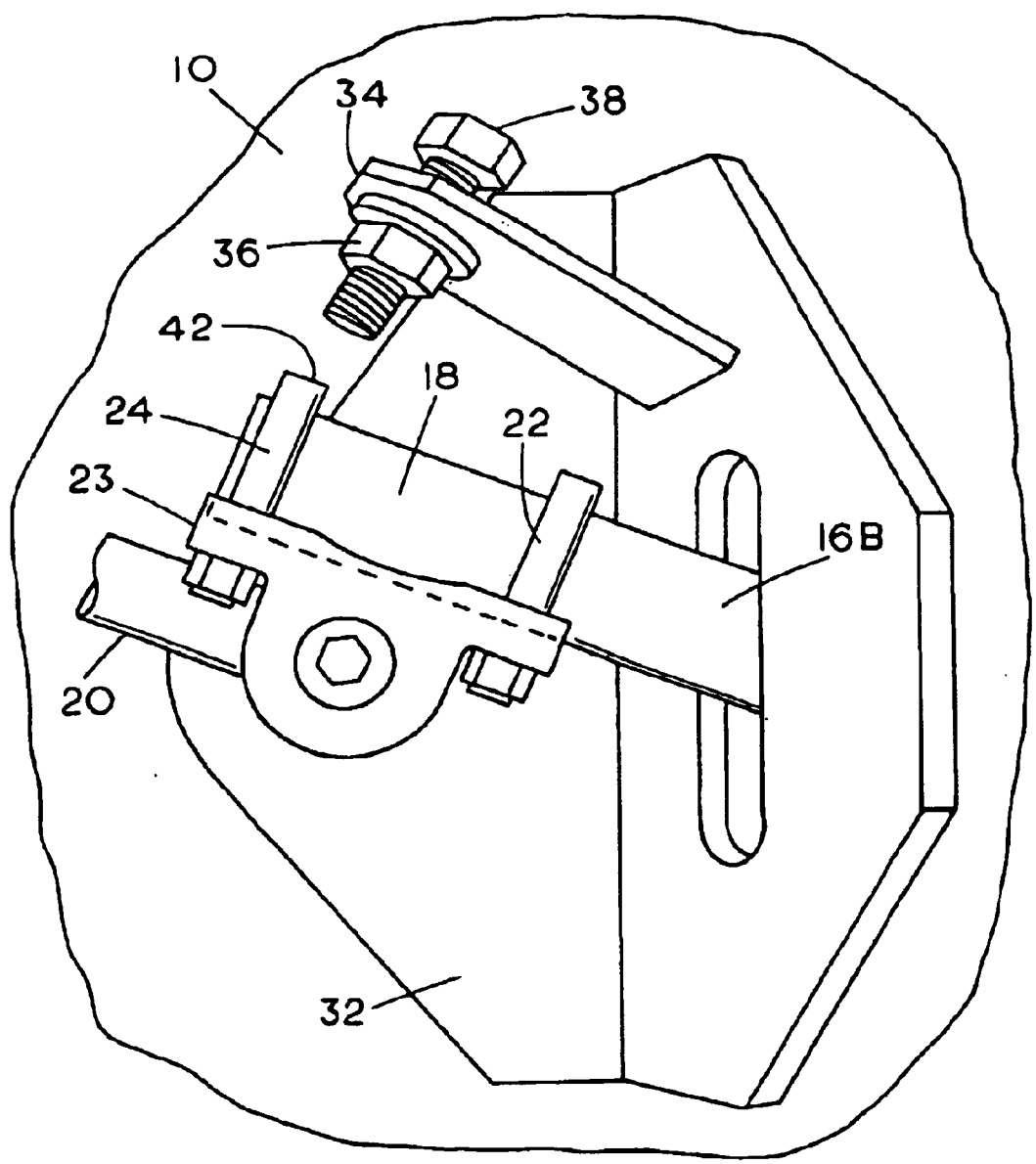
FIG. 5 is a perspective view of a steering bracket weldment showing the mounting for the adjustable stop.

The end of the screw 38 aligns with a flat spot 42 on the top closed end of the U-bolt 24, when the steering lever 16B is pushed all the way forwardly as shown in dotted lines in FIG. 2 and in FIG. 5. The stop bolt 38 will provide a stop against the flat spot 42 of the U-bolt 24 and stop movement of the lever 16B. The stop bolt 38 determines the pivoted position of the lever 16B and the link 28, and thus the position of the swash plate velocity control for the motor 30B. The speed of rotation of the drive motor 30B when the lever 16B is stopped in full forward position can be adjusted.

By driving the loader at the full forward speed positions of the levers 16A and 16B, it can immediately be noted if the wheels on opposite sides of the loader are at equal speeds. If not, one or both of the levers can be changed slightly in its stopped position to change the output speed of the drive pump/motor 30A or 30B for the respective side of the loader. As shown, motor 30B is controlled, and by adjusting the screw 38 and providing a new stopped position for the steering lever 16B when it is in its full forward stroke, an adjusted full speed of the motor 16B will result.

Figure 3:
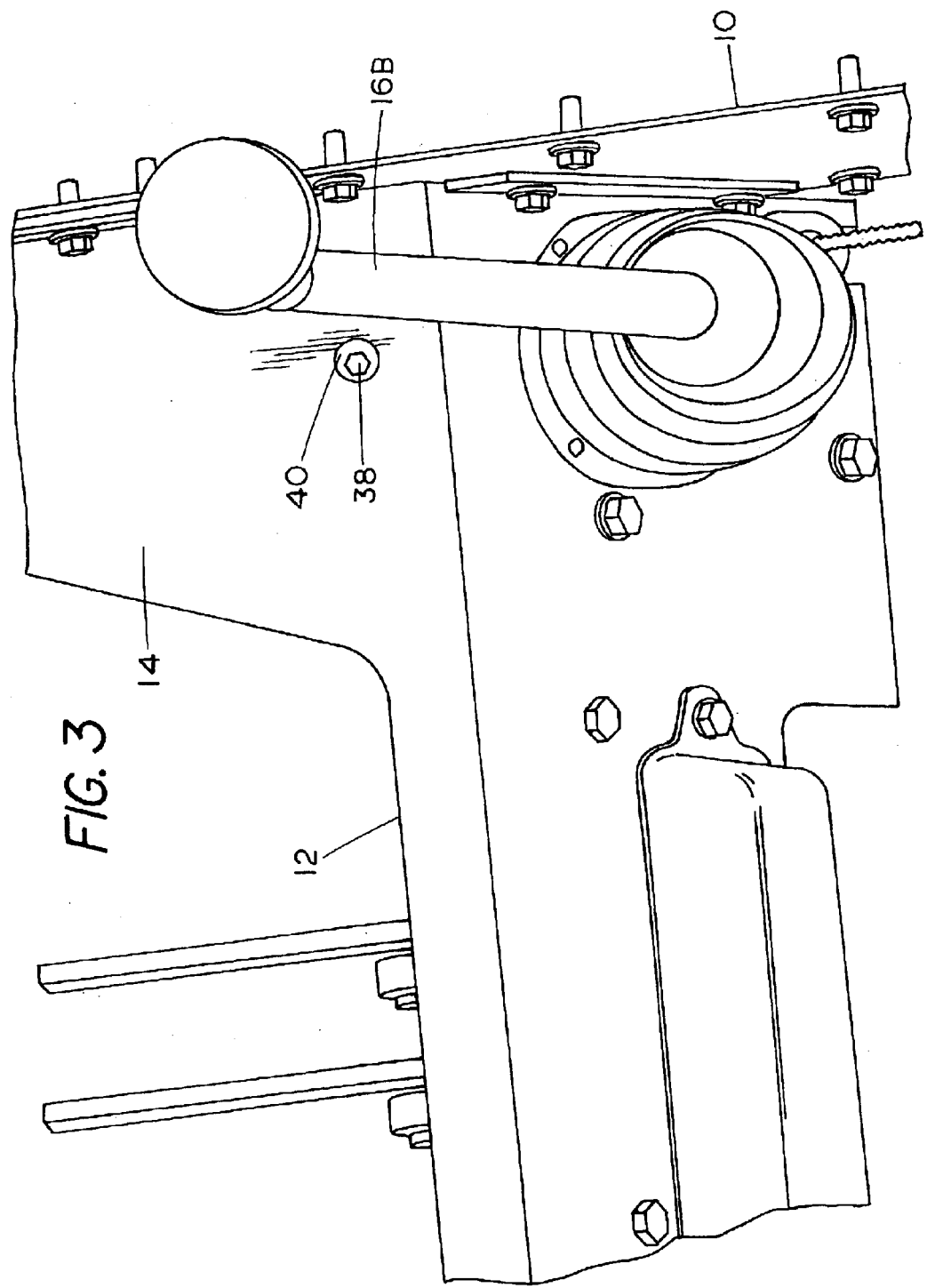
FIG. 3 is a schematic perspective view of the adjustable stop of the present invention.

FIG. 3 is a schematic, fragmentary view showing the access opening 40 and the head of adjusted screw 38. It is thus easily accessible to an operator. It should be noted that the levers 16A and 16B return to neutral when they are released.

Figure 4:
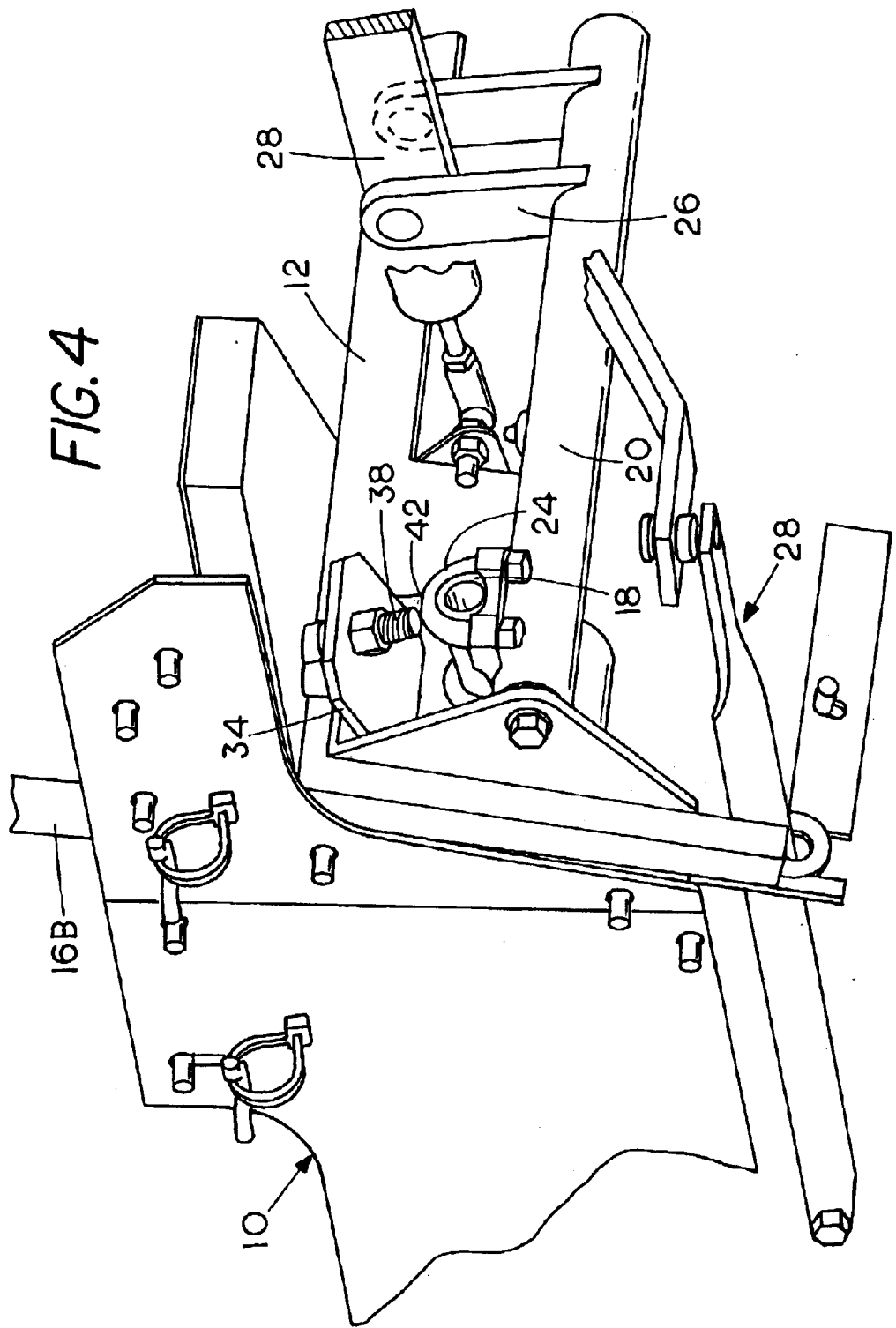
FIG. 4 is a perspective top view showing the steering panel of the cab of a skid steer loader and the access opening for the adjustable stop.

In FIG. 4, the steering lever 16B is shown fragmentarily, in relation to the platform 12, and the stop bolt 38 is engaging the flat spot 42 on the U-bolt 24. It can be seen in FIG. 4 that the arm portion 18 of the steering lever 16B is clamped in place on the shaft 20.

The adjustment can be made by following the procedure outlined above as a method. In other words, an operator can run the skid steer loader at full forward speed using both of the levers 16A and 16B, and it would be immediately apparent if the skid steer loader continues to go straight. If the path is not straight, then the operator will know which motor is running faster than the other, and can make the appropriate adjustment by adjusting the stop bolt or screw 38 toward the correct direction. Then by again trying the vehicle at full forward speed, further adjustments can be made as needed.

The adjustments are made by the operator on the interior of an operator's compartment, and on a side of the operator platform opposite from the adjustment screw.

The opening through the platform thus provides access for adjustment from the inside of the operator's compartment to the lower side where the adjustment is located.

Again, there are separate pump/motor assemblies on each side of a skid steer vehicle, as shown in the prior art, and this can provide an adjustment for at least one of the steering levers in its full forward stroke position.

The nut 36 can be a lock nut, that will provide a sufficient drag on the bolt, so that the bolt 38 will stay in place when adjusted.

Although the present invention has been described with reference to preferred embodiments, workers skilled in the art will recognize that changes may be made in form and detail without departing from the spirit and scope of the invention.

What is claimed is:

1. An adjustment device for matching speed of lever actuated variable speed drive motors on a skid steer vehicle, the skid steer vehicle having a pivoting shaft that pivots to change the speed of a selected drive motor and having an operator's platform, a control lever mounted on the pivoting shaft and moveable from a neutral position to a forward speed position wherein the selected drive motor is in operation at a corresponding speed, an adjustable position stop screw mounted on a side of the operator's platform opposite from an operator, the stop screw being positioned adjacent an opening in the operator's platform and accessible from the operator's side of the platform, the stop screw engaging and stopping a movable portion of the lever at the forward speed position.

2. The adjustment device of claim 1, wherein said lever is mounted onto the pivoting shaft, the pivoting shaft having a saddle and a U-bolt for holding the lever on the pivoting shaft, said stop screw being positioned to engage a closed end of the U-bolt when the lever is in the forward speed position.

3. The adjustment device of claim 1, wherein the forward speed position is the maximum forward speed position of the lever.

4. The adjustment device of claim 1, wherein the control lever extends through an opening into an operator's compartment, and is accessible to an operator from the operator's compartment.

5. The adjustment device of claim 1, wherein said operator's platform has a front portion, and the opening to access the stop screw is through the front portion.

6. An adjustment device for a skid steer loader having drive motors on opposite sides thereof, said drive motors being controlled by separate control levers for direction and speed control, the control levers having a neutral position and a full forward speed position, an adjustable stop screw for stopping at least one of the levers in the full forward speed position, said stop screw being mounted on a bracket positioned adjacent a movable portion of the at least one lever with which it is associated, the stop screw being threadable along an axis of the screw toward and away from said movable portion of the at least one lever, said movable portion of the at least one lever comprising a clamping U-bolt that clamps the at least one lever to a pivoting shaft, said stop screw being positioned adjacent an operator compartment platform, the platform having an opening aligning with the stop screw so the stop screw is accessible from an interior of the operator compartment platform.

7. The adjustment device of claim 6, wherein the pivotal shaft is rotatably mounted on a skid steer loader, a saddle for holding an end of the shaft, said at least one lever being clamped onto the saddle with the clamping U-bolt and a second U-bolt, and one of the U-bolts being aligned to be engaged by the stop screw when the at least one lever moves to its full forward speed position.

8. A method of adjusting the speed of a first drive motor driving wheels on a first side of a skid steer vehicle relative to the speed of a second drive motor driving wheels on a second side of the skid steer vehicle, the speed of the first and drive motors being adjustable by moving first and second control levers, respectively, the method comprising moving the first and second control levers for the respective first and second drive motors to a full forward speed position, providing an adjustable stop on an exterior of an operator's compartment of the skid steer vehicle for at least one of the control levers in the full forward speed position and accessible from an interior of the operator's compartment, and adjusting the stop for the at least one control lever from the interior of the operator's compartment with both control levers in the full forward speed position until the first and second drive motors drive the wheels on the respective sides of the vehicle at substantially equal velocity.

9. The method of claim 8, wherein the adjusting step is performed until the skid steer vehicle moves in a substantially straight line when both of the control levers are in the full forward speed position.

* * * * *

UNITED STATES PATENT AND TRADEMARK OFFICE
CERTIFICATE OF CORRECTION

PATENT NO. : 6,942,047 B2
DATED : September 13, 2005
INVENTOR(S) : Woytassek

It is certified that error appears in the above-identified patent and that said Letters Patent is hereby corrected as shown below:

Column 4,
Line 63, before "drive" insert -- second --.

Signed and Sealed this

Twenty-seventh Day of December, 2005

JON W. DUDAS
*Director of the United States Patent and Trademark Office*